US012709382B2

(12) United States Patent
Kerr

(10) Patent No.: US 12,709,382 B2
(45) Date of Patent: Aug. 18, 2026

(54) HYDRAULIC ACTUATION SYSTEM

(71) Applicant: Airbus Operations Limited, Filton (GB)

(72) Inventor: Sean Kerr, Filton (GB)

(73) Assignee: Airbus Operations Limited, Filton (GB)

(*) Notice: Subject to any disclaimer, the term of this patent is extended or adjusted under 35 U.S.C. 154(b) by 0 days.

(21) Appl. No.: 18/967,127

(22) Filed: Dec. 3, 2024

(65) Prior Publication Data

US 2025/0187725 A1 Jun. 12, 2025

(30) Foreign Application Priority Data

Dec. 7, 2023 (GB) .................................... 2318714

(51) Int. Cl.
*F15B 15/14* (2006.01)
*B64C 25/22* (2006.01)

(52) U.S. Cl.
CPC .............. *B64C 25/22* (2013.01); *F15B 15/14* (2013.01)

(58) Field of Classification Search
CPC ....... F15B 11/024; F15B 13/021; B64C 25/22
See application file for complete search history.

(56) References Cited

U.S. PATENT DOCUMENTS 2,367,682 A 1/1945 Kehle
4,442,912 A * 4/1984 Vette .................... B62D 33/067 91/534
6,186,043 B1 * 2/2001 Callies .................. F15B 15/224 91/422
6,397,590 B1 * 6/2002 Hart ........................ F15B 21/04 60/329

(Continued)

FOREIGN PATENT DOCUMENTS

CA 2028342 A1 4/1992
CN 113833707 A 12/2021

(Continued)

OTHER PUBLICATIONS

United Kingdom Search Report for corresponding United Kingdom Patent Application No. 2318714.9 dated May 21, 2024.

*Primary Examiner* — Thomas E Lazo

(74) *Attorney, Agent, or Firm* — Greer, Burns & Crain, Ltd.

(57) ABSTRACT

A hydraulic actuation system for an aircraft. The system comprises: a hydraulic actuator comprising: a housing to accommodate hydraulic fluid; an extension chamber and a retraction chamber each defined by the housing; and a bypass line in fluid communication with the extension chamber and the retraction chamber, the bypass line comprising a flow restrictor and a bypass valve, the flow restrictor configured to restrict a rate of fluid flow through the bypass line; and a controller configured to receive a signal indicative that the aircraft is in a take-off or a landing (Continued)

procedure, to determine that the aircraft is performing the take-off or the landing procedure based on the signal, and to perform an operation to cause the bypass valve to open to allow the hydraulic fluid to flow through the bypass line only when the controller determines that the aircraft is performing the take-off or the landing procedure.

20 Claims, 6 Drawing Sheets

(56) References Cited

U.S. PATENT DOCUMENTS 6,792,844 B1 * 9/2004 Gedge .................. F15B 13/021 251/63.4
10,550,865 B2 * 2/2020 Lesage .................. B64C 13/42
10,816,019 B2 * 10/2020 Uhlman .................. F15B 20/005
2014/0318652 A1 * 10/2014 Sommer .................. F15B 13/043 137/625.64
2019/0071136 A1 * 3/2019 Benevelli .................. B62D 33/0617
2019/0186512 A1 * 6/2019 Didey .................. F15B 21/042
2022/0194564 A1 * 6/2022 L'Allier .................. B64C 25/16

FOREIGN PATENT DOCUMENTS

CN 215043641 U 12/2021
EP 3228580 A1 10/2017
EP 3299638 A1 3/2018
EP 3882135 A1 9/2019
GB 2586639 A 3/2021
GB 2586790 A 3/2021
JP H044307 A 1/1992
JP 2009228775 A 10/2009
JP 2019157908 A * 9/2019
WO 2021037829 A1 3/2021

* cited by examiner

HYDRAULIC ACTUATION SYSTEM

CROSS-REFERENCES TO RELATED APPLICATIONS

This application claims the benefit of Great Britain Patent Application Number 2318714.9 filed on Dec. 7, 2023, the entire disclosure of which is incorporated herein by way of reference.

FIELD OF THE INVENTION

The present invention relates to hydraulic actuation systems for aircraft, and particularly to landing gear systems for aircraft.

BACKGROUND OF THE INVENTION

When an aircraft takes off from an airport, it needs to be able to achieve sufficient climb performance to clear any obstacles, such as a boundary fence and buildings, with sufficient margin. A factor that influences the climb performance is drag generated by landing gear of the aircraft. When a retractable landing gear is extended, as is the case during take-off, it generates a lot of drag and therefore reduces the ability of the aircraft to accelerate and climb. The length of time it takes to retract the landing gear influences the total drag and, therefore, the climb performance of the aircraft. Reducing the retraction time would reduce the total drag acting on the aircraft. It may additionally, or alternatively, allow an increase in maximum take-off weight of the aircraft for a given size of landing gear system, wing capability and engine thrust, while still enabling the aircraft to achieve sufficient climb performance. It is therefore desirable to retract the landing gear as soon as possible after take-off.

Many landing gear systems employ hydraulically actuated actuators to retract the landing gear. If the temperature of such an actuator drops, then so too does the temperature of hydraulic fluid that is used to actuate the actuator. This results in the hydraulic fluid becoming increasingly viscous, which increases its resistance to flow and, therefore, the time it takes to actuate the actuator. Accordingly, decreasing the temperature of the actuator can have a very significant impact on the time it takes to retract the landing gear and, therefore, the climb performance of the aircraft and/or the maximum take-off weight of the aircraft.

SUMMARY OF THE INVENTION

A first aspect of the present invention provides a hydraulic actuation system for an aircraft, the hydraulic actuation system comprising: a hydraulic actuator comprising: a housing configured to accommodate hydraulic fluid; an extension chamber and a retraction chamber each defined by the housing; and a bypass line in fluid communication with each of the extension chamber and the retraction chamber, the bypass line comprising a flow restrictor and a bypass valve, the flow restrictor being configured to restrict a rate of fluid flow through the bypass line; and a controller configured to receive an aircraft status signal indicative that the aircraft is performing one of a take-off procedure and a landing procedure, to determine that the aircraft is performing the take-off procedure or the landing procedure on the basis of the aircraft status signal, and to perform an operation to cause the bypass valve to open to allow the hydraulic fluid to flow through the bypass line only when the controller determines that the aircraft is performing the take-off procedure or the landing procedure.

With the bypass valve closed, flow of hydraulic fluid to the extension chamber or the retraction chamber acts to actuate the hydraulic actuator. Only when the bypass valve is open is hydraulic fluid able to flow through the bypass line, and thus through the flow restrictor. Flow of fluid through the flow restrictor generates heat in the fluid and its surroundings. Therefore, as the hydraulic fluid flows through the flow restrictor after the bypass valve has opened, the hydraulic fluid and its surroundings increase in temperature. This reduces the viscosity of the hydraulic fluid so that it flows more readily, and thus reduces the time it takes to subsequently actuate the hydraulic actuator using the hydraulic fluid.

Opening the bypass valve only when it is determined that the aircraft is performing the take-off procedure or the landing procedure results in the heat generation happening only when the hydraulic actuator is to be imminently operated. This is more efficient than generating the heat at times when the hydraulic actuator is not to be imminently operated, such as when the aircraft is in flight before preparing for landing, which otherwise could result either in excess heat energy being generated in the hydraulic fluid and its surrounds or in heat energy being lost to the environment outside the hydraulic actuator.

Optionally, the hydraulic actuation system comprises a user interface configured to receive a user request from a flight crew and to send a user request signal indicative of the user request to the controller, and the controller is configured to perform the operation only when the controller has: received the user request signal, and determined that the aircraft is performing the take-off procedure or the landing procedure. Accordingly, in use, the flight crew retains ultimate authority to dictate when the bypass valve is to be opened. This could be beneficial, for example, when reduced hydraulic power is available and the hydraulic actuation system is for actuating one or more systems that are non-critical to take-off or landing of the aircraft.

Optionally, the hydraulic actuation system comprises a condition sensor configured to detect a condition of the hydraulic actuator and to output a condition signal indicative of the condition. Such a condition signal may be visible or audible to a human, such as flight crew or ground crew, so that the human is able to determine the condition of the hydraulic actuator. The flight crew is therefore able to make an informed decision as to whether or not to input the user request to the user interface to cause the bypass valve to be opened. The condition of the hydraulic actuator may, for example, be one of: a time taken for the hydraulic actuator to actuate, a speed of actuation of the hydraulic actuator, a pressure drop between two points in the hydraulic actuator, a viscosity of the hydraulic fluid in the hydraulic actuator, and a temperature of the hydraulic fluid in the hydraulic actuator.

Optionally, the hydraulic actuation system comprises a control system, the condition sensor is configured to output the condition signal to the control system, and the control system is configured to cause the user interface to provide an indication of the condition to the flight crew on the basis of the condition signal. Again, the flight crew is therefore able to make an informed decision as to whether or not to input the user request to the user interface to cause the bypass valve to be opened. The control system may be, or may comprise, the controller. Alternatively, the control system may be distinct from the controller.

Optionally, the control system is configured, on the basis of the condition signal, to determine whether or not the condition meets a predetermined criterion, and to cause the user interface to provide the indication only when the control system determines that the condition meets the predetermined criterion. This avoids the flight crew being notified about the condition when the condition does not meet the predetermined criterion, which otherwise could be a distraction. The predetermined condition could be that the condition, such as the viscosity or the time taken, meets or exceeds a predetermined threshold value at which warming the hydraulic fluid and its surroundings would be beneficial. The predetermined condition could be that the condition, such as the temperature of the hydraulic fluid, or the speed of actuation or the pressure drop, meets or is below a predetermined threshold value at which warming the hydraulic fluid and its surroundings would be beneficial.

Optionally, the hydraulic actuation system comprises an aircraft status sensor system configured to sense that the aircraft is performing the one of the take-off procedure and the landing procedure, and to send the aircraft status signal to the controller. Accordingly, the hydraulic actuation system need not be informed that the aircraft is performing the take-off procedure or the landing procedure by an external system or party, such as the flight crew. The aircraft status sensor system may comprise only one sensor or a plurality of sensors. Example sensors that the aircraft status sensor system may comprise are: a weight-on-wheel sensor to sense whether there is weight on one or more of the aircraft's wheels, an altitude sensor to sense an altitude of the aircraft, and a distance sensor to sense a distance between the aircraft and the ground.

In some examples, the bypass valve defines a port that is openable to allow the hydraulic fluid to flow through the bypass line, and the flow restrictor is defined by the port when the port is open. In such cases, it is necessary to suitably specify the open cross-sectional area of the port when the port is opened to a maximum extent, since this will determine a minimum amount of heat that flow of the hydraulic fluid though the port would generate.

Optionally, the flow restrictor is in series with the bypass valve. Using the flow restrictor, rather than a port of the bypass valve, to generate the heat reduces the accuracy with which the maximum extent of opening of the bypass valve needs to be specified, since all that is then required is for the bypass valve to be openable to an open cross-sectional area that is at least that of the flow restrictor. The flow restrictor may, for example, be a flow restrictor valve or flow control valve.

Optionally, the flow restrictor has an open cross-sectional area of between 4 $mm^2$ and 14 $mm^2$. To generate a desired amount of heat at the flow restrictor as the hydraulic fluid flows though the flow restrictor, it will be necessary to suitably specify the open cross-sectional area of the flow restrictor. At least for the types of hydraulic fluids that are certified for use in aircraft hydraulic actuation systems, an open cross-sectional area within this range would result in the flow of hydraulic fluid through the flow restrictor generating enough heat within a time period that is compatible with the needs of the hydraulic actuator and/or an aircraft in which it is to be implemented. In such cases, the bypass valve might need to be open for only around five to ten seconds for sufficient heat to be generated. In some examples, the flow restrictor has an open cross-sectional area of less than 4 $mm^2$, although the bypass valve might then need to be open for around a minute for sufficient heat to be generated.

Optionally, the hydraulic actuation system comprises a valve status sensor configured to sense whether or not the bypass valve is open and to output a valve status signal indicative of whether or not the bypass valve is open. Such a valve status signal may be visible or audible to a human, such as flight crew or ground crew, so that the human is able to determine whether or not the bypass valve is open. Alternatively, the valve status signal may be for sending to a control system, so that the control system is able to determine whether or not the bypass valve is open.

Optionally, the valve status sensor comprises one or more of: a sensor configured to sense a state of the bypass valve; and a sensor configured to sense a parameter of hydraulic fluid in the bypass line. Accordingly, when the valve status sensor is configured to sense a state of the bypass valve, the valve status sensor is configured to directly sense whether or not the bypass valve is open. When the valve status sensor is configured to sense a parameter of hydraulic fluid in the bypass line, the valve status sensor is configured to indirectly sense, or infer, whether or not the bypass valve is open. The parameter may, for example, be one of a temperature of the hydraulic fluid, a flow of the hydraulic fluid, or a flow rate of the hydraulic fluid.

Optionally, the bypass line is at least partially located outside of the housing. This can make design and manufacture of the hydraulic actuator straightforward and cost-effective, and can make inspection and maintenance of the hydraulic actuator quicker and easier.

Optionally, the housing comprises a wall of the extension chamber and/or of the retraction chamber, and the bypass line is at least partially located within the wall. As compared to an alternative hydraulic actuator in which components outside of the housing are used to provide the bypass line, this results in less of the generated heat being lost to the environment outside the hydraulic actuator, and thus improves efficiency. It also reduces the number of components in the hydraulic actuator, which can reduce a required amount of maintenance and can potentially make the hydraulic actuator more lightweight.

Optionally, the hydraulic actuator comprises a movable separator separating the extension chamber from the retraction chamber, and the bypass line is located within the movable separator. This further reduces the amount of generated heat being lost to the environment outside the hydraulic actuator, and thus improves efficiency. The movable separator may be, for example, in the form of a piston or a membrane.

Optionally, the hydraulic actuator comprises: a first hydraulic line fluidically connected to the extension chamber, and a second hydraulic line fluidically connected to the retraction chamber; wherein the bypass line has a first end that opens directly into the first hydraulic line, and a second end that opens directly into the second hydraulic line. This results in the hydraulic fluid that passes through the bypass line not needing to pass into or through either of the extension chamber and the retraction chamber. This reduces the number of openings into the extension chamber and the retraction chamber that are required, which simplifies the design of the extension chamber and the retraction chamber and can thus increase reliability of the hydraulic actuator.

Optionally, the hydraulic actuation system comprises: a supply line fluidly connected to the extension chamber and configured to carry hydraulic fluid pressurized to a supply pressure to the extension chamber; and a return line fluidly connected to the retraction chamber and configured to return hydraulic fluid to a reservoir from the retraction chamber.

Optionally, the hydraulic actuation system is a landing gear system. In some such cases, the hydraulic actuator is for retracting and/or extending a landing gear. In other cases, the hydraulic actuator is for opening and/or closing a landing gear bay door that covers a landing gear bay into which the landing gear is retractable. Accordingly, provision of the hydraulic actuator means that the landing gear system is able to operate sufficiently well in low operating temperatures.

A second aspect of the present invention provides a method of operating a hydraulic actuation system of an aircraft, the hydraulic actuation system comprising: a hydraulic actuator comprising a housing configured to accommodate hydraulic fluid, an extension chamber and a retraction chamber each defined by the housing, and a bypass line in fluid communication with each of the extension chamber and the retraction chamber, the bypass line comprising a flow restrictor and a bypass valve, the flow restrictor being configured to restrict a rate of fluid flow through the bypass line; the method comprising: performing an operation, to cause the bypass valve to open to allow the hydraulic fluid to flow through the bypass line, when the aircraft is performing one of a take-off procedure and a landing procedure.

Optionally, the hydraulic actuation system comprises a controller, and the method comprises the controller: receiving an aircraft status signal indicative that the aircraft is performing the take-off procedure or the landing procedure; determining that the aircraft is performing the take-off procedure or the landing procedure on the basis of the aircraft status signal; and performing the operation only when the controller determines that the aircraft is performing the take-off procedure or the landing procedure.

A third aspect of the present invention provides a computing system comprising one or more processors configured to perform the method according to the second aspect.

A fourth aspect of the present invention provides a data carrier comprising machine readable instructions for the operation of one or more processors of the computing system of the third aspect to perform the method of the second aspect.

A fifth aspect of the present invention provides a computer program comprising instructions which, when the program is executed by a computing system, cause the computing system to carry out the method of the second aspect.

A sixth aspect of the present invention provides an aircraft comprising the hydraulic actuation system of the first aspect, or comprising the computing system of the third aspect, or comprising the data carrier of the fourth aspect, or comprising the computer program of the fifth aspect.

The hydraulic actuation system of the first aspect may be supplied in isolation, i.e., without any other parts of an aircraft. Each of the computing system of the third aspect, the data carrier of the fourth aspect, and the computer program of the fifth aspect may be supplied in isolation, i.e., without any other parts of an aircraft and without the hydraulic actuation system of the first aspect.

Optional features of any one of the aspects of the present invention may be applied equally to any other one of the aspects of the present invention, where appropriate.

BRIEF DESCRIPTION OF THE DRAWINGS

Embodiments of the invention will now be described, by way of example only, with reference to the accompanying drawings, in which.

DETAILED DESCRIPTION OF THE PREFERRED EMBODIMENTS

Figure 1:
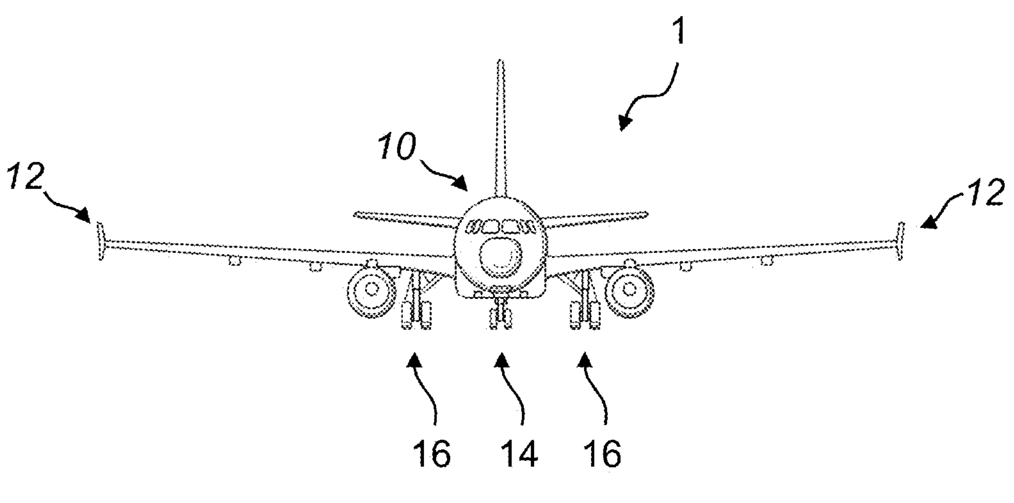
FIG. 1 shows a schematic front view of an aircraft.
Figure 2:
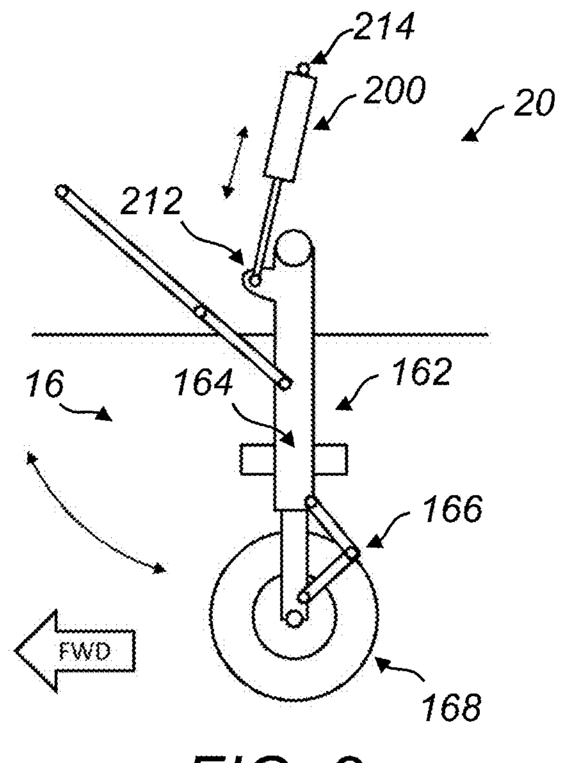
FIG. 2 shows a schematic side view of a landing gear of the aircraft of FIG. 1.

The aircraft 1 shown in FIG. 1 has a fuselage 10, a pair of wings 12 extending from the fuselage 10, a nose landing gear 14 mounted on the fuselage 10, and two main landing gears 16 mounted on the respective wings 12. One of the main landing gears 16 is shown in FIG. 2. The main landing gear 16 comprises a landing gear leg 162 comprising a shock absorber 164 and a torque link 166. A set of wheels 168 is mounted to a bottom distal end of the leg 162. In some other embodiments, the main landing gear 16 comprises a bogie pivotally mounted to the landing gear leg 162 and a plurality of sets of wheels mounted to the bogie.

Figure 3:
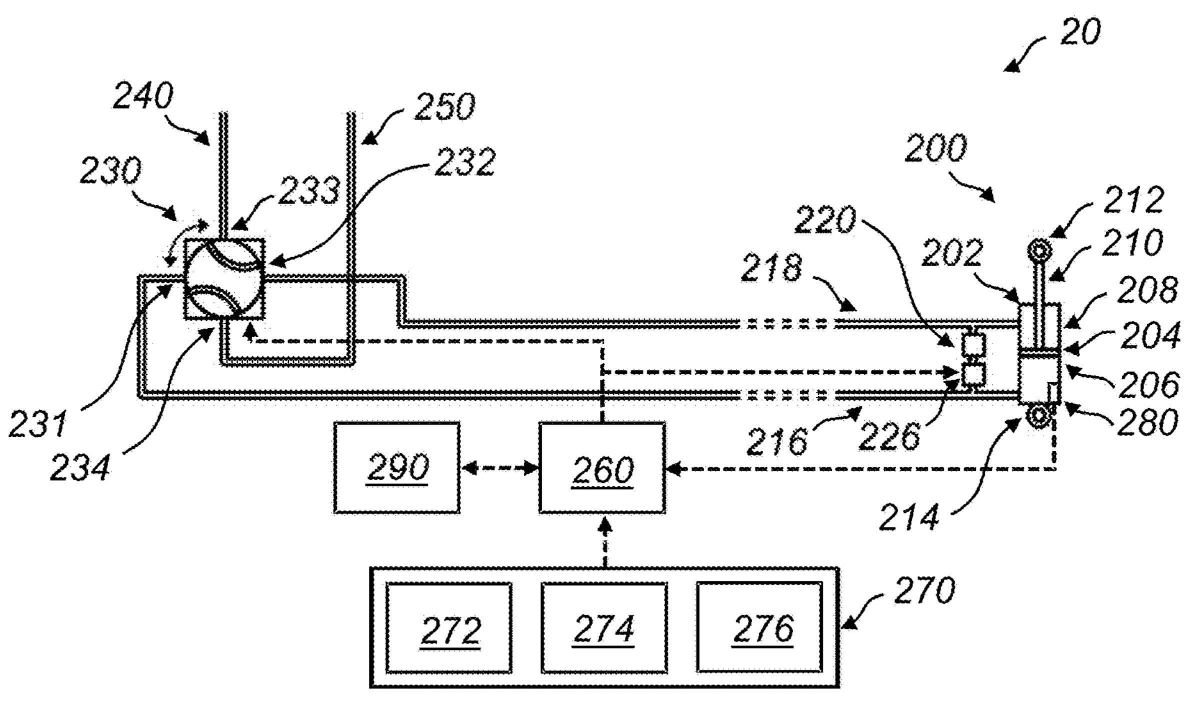
FIG. 3 shows a schematic diagram of part of a landing gear extension and retraction system of the aircraft of FIG. 1.

The aircraft 1 has a hydraulic actuation system, in the form of a landing gear system, 20 coupled to the main landing gear 16. The landing gear system 20 is a landing gear extension and retraction system (LGERS), since it is for both extending and retracting the main landing gear 16. The LGERS 20 comprises various components including a double-acting hydraulic actuator 200 (hereinafter called "the actuator 200") that acts to extend and retract the main landing gear 16. The LGERS 20 also includes a landing gear bay door actuator (not shown), as well as a landing gear up-lock mechanism (not shown) and a landing gear down-lock mechanism (not shown), which include their own hydraulic actuators (not shown) as would be known to the skilled reader. Part of the LGERS 20, including the actuator 200, is shown in the schematic diagram of FIG. 3.

The actuator 200 has a cylindrical housing 202 that is sealed and able to accommodate hydraulic fluid for actuating the actuator 200. Movably located within the cylindrical housing 202 is a piston 204 of the actuator 200. The cylindrical housing 202 defines and encircles an extension chamber 206 and a retraction chamber 208 on respective sides of the piston 204. The piston 204 is a movable separator that separates the extension chamber 206 from the retraction chamber 208. The piston 204 is attached to a piston rod 210, a free end 212 of which is pivotally mounted to the leg 162 of the main landing gear 16. An end 214 of the housing 202 that is distal from the free end 212 of the piston rod 210 is pivotally mounted to a fixed structural part (not shown) of the aircraft 1.

The actuator 200 further has a first hydraulic line 216, which is fluidically connected to the extension chamber 206, and a second hydraulic line 218, which is fluidically connected to the retraction chamber 208. The first and second hydraulic lines 216, 218 are connected at their respective opposite ends to respective first and second ports 231, 232 of a selector valve 230 of the LGERS 20. The selector valve 230 has third and fourth ports 233, 234 that are respectively fluidly connected to a supply line 240 and a return line 250 of the LGERS 20. The LGERS 20 has a hydraulic fluid reservoir (not shown) that is fluidically connected to both the supply line 240 and the return line 250. A pump (not shown) is included in the supply line 240 to draw hydraulic fluid from the reservoir and supply it to the selector valve 230 at a supply pressure.

The selector valve 230 has a first mode in which it places the first hydraulic line 216 into fluidic communication with the supply line 240 and places the second hydraulic line 218 into fluidic communication with the return line 250. The selector valve 230 has a second mode in which it places the first hydraulic line 216 into fluidic communication with the return line 250 and places the second hydraulic line 218 into fluidic communication with the supply line 240. The selector valve 230 also has a third mode in which it takes both the supply line 240 and the return line 250 out of fluidic communication with both the first and second hydraulic lines 216, 218. The selector valve 230 is communicatively connected to, and, in use, controlled by, a controller 260 of the LGERS 20. The controller 260 is programmed to command the selector valve 230 to move to a fixed number of discrete positions (three, in this case) corresponding to the modes of the selector valve 230. As a result, the selector valve 230 does not provide for proportional control of pressure of the hydraulic fluid delivered to the first and second hydraulic lines 216, 218.

When the landing gear 16 is to be extended, the selector valve 230 is put into its first mode and the pump is operated, so that hydraulic fluid flows from the reservoir and through the supply line 240 towards the selector valve 230. This causes downstream hydraulic fluid to flow via the first hydraulic line 216 to the extension chamber 206 to cause the piston 204 to move away from the end 214 of the housing 202. This movement of the piston 204 displaces hydraulic fluid in the retraction chamber 208, which therefore flows from the retraction chamber 208 and into the second hydraulic line 218. Downstream hydraulic fluid in the second hydraulic line 218 flows through the selector valve 230 and the return line 250 to the reservoir. When the landing gear 16 is to be retracted, the selector valve 230 is put into its second mode and the pump is operated, so that hydraulic fluid flows from the reservoir and through the supply line 240 towards the selector valve 230. This causes downstream hydraulic fluid to flow via the second hydraulic line 218 to the retraction chamber 208 to cause the piston 204 to move towards the end 214 of the housing 202. This movement of the piston 204 displaces hydraulic fluid in the extension chamber 206, which therefore flows from the extension chamber 206 and into the first hydraulic line 216. Downstream hydraulic fluid in the first hydraulic line 216 flows through the selector valve 230 and the return line 250 to the reservoir. When the landing gear 16 is to be held in position, the selector valve 230 is put into its third mode and operation of the pump is ceased.

The actuator 200 and the selector valve 230 are remote from each other. Lengths of the first and second hydraulic lines 216, 218 are such that a volume of hydraulic fluid contained in each of the first and second hydraulic lines 216, 218 is greater than a volume of hydraulic fluid contained in the respective chamber 206, 208 of the actuator 200 to which they are connected. Therefore, absent a bypass arrangement 220 of the actuator 200, which is discussed below, each of the first and second hydraulic lines 216, 218 would contain a volume of hydraulic fluid that may not move through the selector valve 230 as the actuator 200 extends and retracts; rather, these volumes would essentially be columns of hydraulic fluid that merely move backwards and forwards in the first and second hydraulic lines 216, 218. As such, in use, a large proportion of the hydraulic fluid in the LGERS 20 would not undergo sufficient motion to warm it to a degree that keeps its viscosity sufficiently low for the hydraulic fluid to flow appropriately to actuate the actuator 200 within an acceptable time period.

Figure 4:
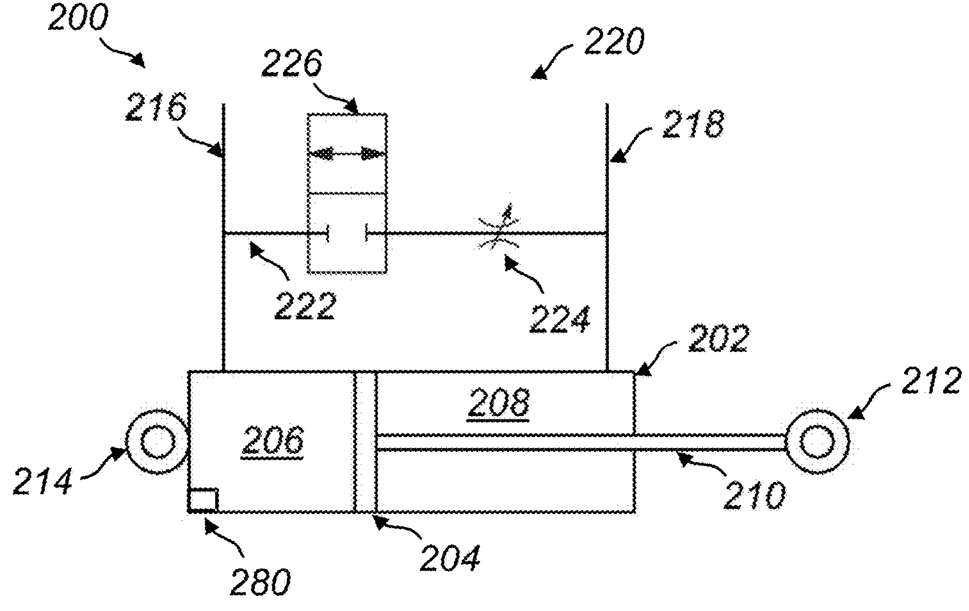
FIG. 4 shows a schematic diagram of a hydraulic actuator of the landing gear extension and retraction system of FIG. 3.

The bypass arrangement 220 is shown in more detail in FIG. 4, which is a schematic diagram of the actuator 200. The bypass arrangement 220 includes a bypass line 222 outside of, and proximate to, the housing 202 of the actuator 200. The bypass line 222 has a first end that opens directly into the first hydraulic line 216 and therefore places the bypass line 222 in fluid communication with the extension chamber 206 of the actuator 200, and an opposite, second end that opens directly into the second hydraulic line 218 and therefore places the bypass line 222 in fluid communication with the retraction chamber 208 of the actuator 200. When hydraulic fluid flows through the bypass line 222, in use, it bypasses the extension and retraction chambers 206, 208.

The bypass line 222 also includes a flow restrictor arrangement in the form of a flow restrictor valve 224, or flow control valve, and a bypass valve arrangement in the form of a valve 226 (hereinafter called "the bypass valve 226") connected in series with the flow restrictor valve 224. The flow restrictor valve 224 is a flow restrictor with an open cross-sectional area of about 10 $mm^2$. This is less than an open cross-sectional area of the rest of the bypass line 222, and so the flow restrictor valve 224 acts to restrict a rate of flow of the hydraulic fluid through the bypass line 222 in use. In this example, the flow restrictor is a flow restrictor valve with a variable open cross-sectional area, so that the open cross-sectional area can be set to a suitable value depending on the hydraulic fluid to be used and the open cross-sectional area of the rest of the bypass line 222. However, in other examples, the flow restrictor could be, for example, a non-adjustable orifice of a fixed open cross-sectional area that is suitable for use with the chosen hydraulic fluid.

When the bypass valve 226 is closed, as shown in FIG. 4, the bypass valve 226 prevents hydraulic fluid from flowing through the bypass line 222 and thus through the flow restrictor valve 224. Any flow of hydraulic fluid to the extension chamber 206 or to the retraction chamber 208 acts to move the piston 204 to actuate the actuator 200, as described above. On the other hand, when the bypass valve 226 is open, the bypass valve 226 permits flow of hydraulic fluid through the bypass line 222 and thus through the flow restrictor valve 224. As the hydraulic fluid flows through the flow restrictor valve 224, the hydraulic fluid and its surroundings, including the housing 202 of the actuator 200 and its contents, increase in temperature. This reduces the viscosity of the hydraulic fluid so that it flows more readily, and thus reduces the time it takes to subsequently actuate the actuator 200 using the hydraulic fluid.

Three different types of mechanism are provided to control opening and closing of the bypass valve 226. This reduces a risk of there being a common mode failure that otherwise restricts or prevents the bypass valve 226 from being opened, such as due to a fault or extreme cold working conditions affecting one of the mechanisms. Broadly speaking, these three mechanisms are a passive mechanism, an automatic mechanism and a manual mechanism. They will now be discussed in turn, with reference to FIGS. 5*a* to 6*b*.

Figure 5A:
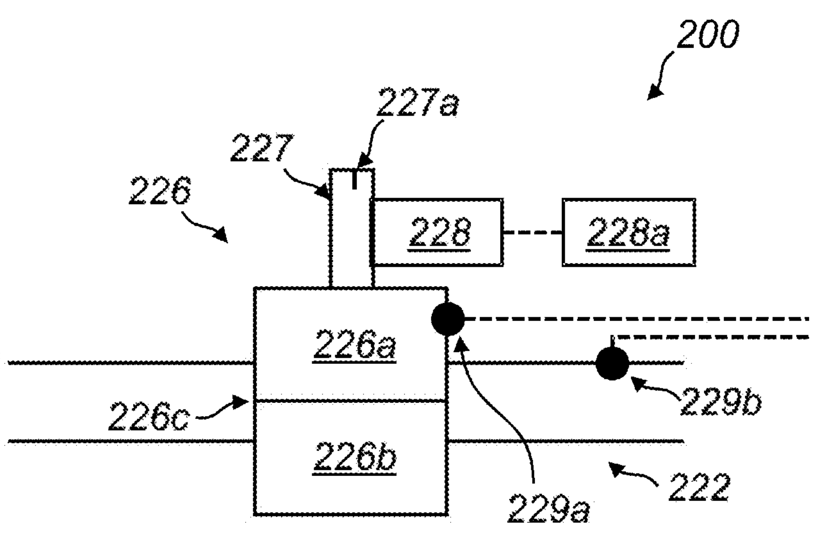
FIG. 5*a* shows a schematic diagram of a bypass valve of the hydraulic actuator of FIG. 4 in a closed state.
Figure 5B:
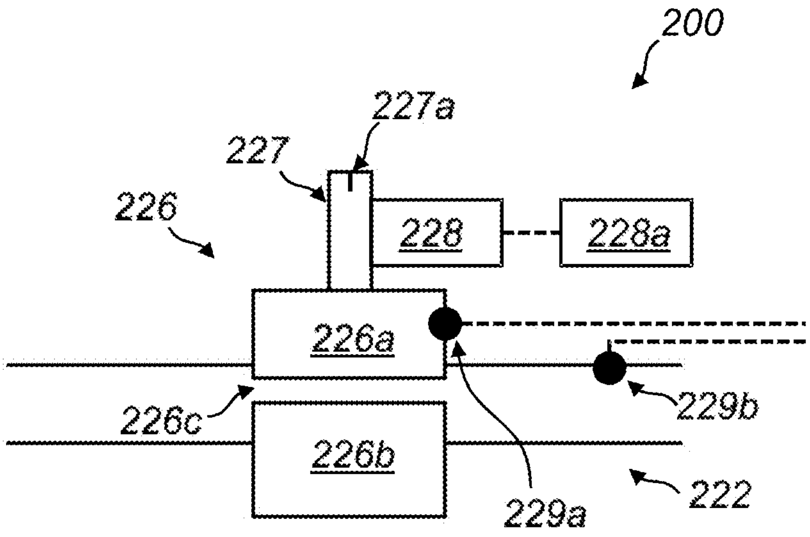
FIG. 5*b* shows a schematic diagram of a bypass valve of the hydraulic actuator of FIG. 4 in an open state.

As shown in FIG. 5*a*, the bypass valve 226 has material that defines an openable port 226*c*, which is openable to allow the hydraulic fluid to flow through the bypass valve 226 and thus through the flow restrictor valve 224. This material changes shape as its temperature drops and, in particular, as its temperature falls below minus 20 degrees Celsius, the shape change is such that the port opens. More specifically, the material comprises first and second components 226*a*, 226*b* that together define the port 226*c*. The first and second components are respectively formed from steel and copper, which have different respective contraction rates. When the first and second components abut each other, as shown in FIG. 5*a*, the port 226*c* is closed. This is the natural state of the first and second components 226*a*, 226*b* during normal operation of the LGERS 20 when the temperature of the first and second components 226*a*, 226*b* is at least minus 20 degrees Celsius. However, when the temperature of the components 226*a*, 226*b* falls below minus 20 degrees Celsius, the components inherently contract at different respective rates to form a clearance or gap between the first and second components 226*a*, 226*b*, as shown in FIG. 5*b*. This gap is the open port 226*c*, which allows flow of hydraulic fluid through the flow restrictor valve 224 to generate heat as described above. Once the heat generated is sufficient to bring the temperature of the first and second components 226*a*, 226*b* back to, or above, minus 20 degrees Celsius, the first and second components 226*a*, 226*b* expand so as to revert to their previous shapes and close the port 226*c*.

In other examples, depending on the type of hydraulic fluid to be used in the LGERS 20 and its flow characteristics at different temperatures, a different combination of materials could be used for the first and second components 226*a*, 226*b*, such that the port 226*c* opens at a temperature other than minus 20 degrees Celsius.

Figure 6A:
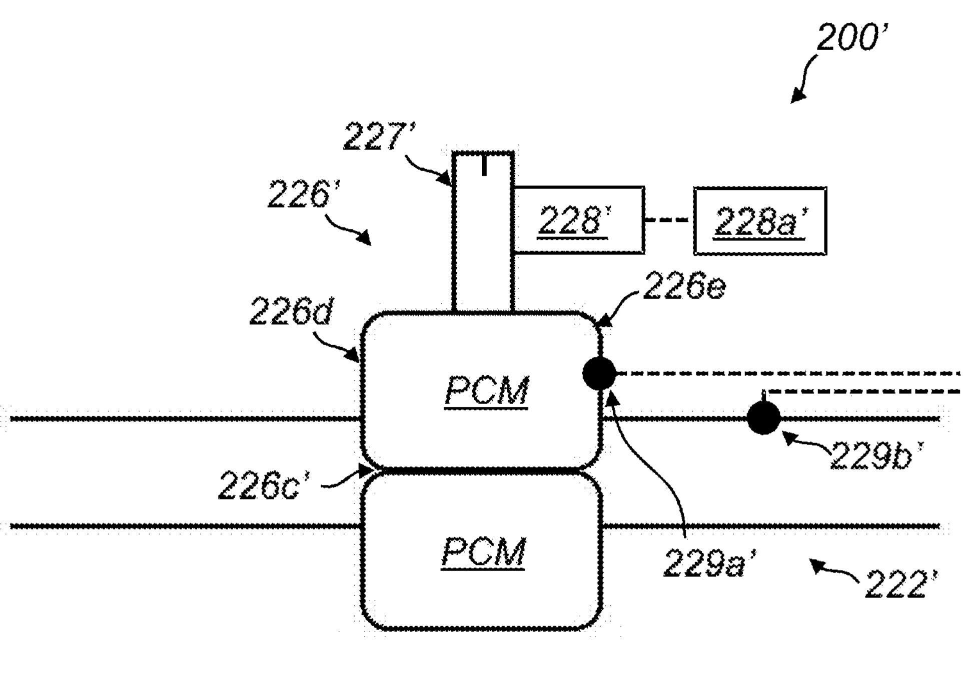
FIG. 6*a* shows a schematic diagram of another bypass valve of the hydraulic actuator of FIG. 4 in a closed state.
Figure 6B:
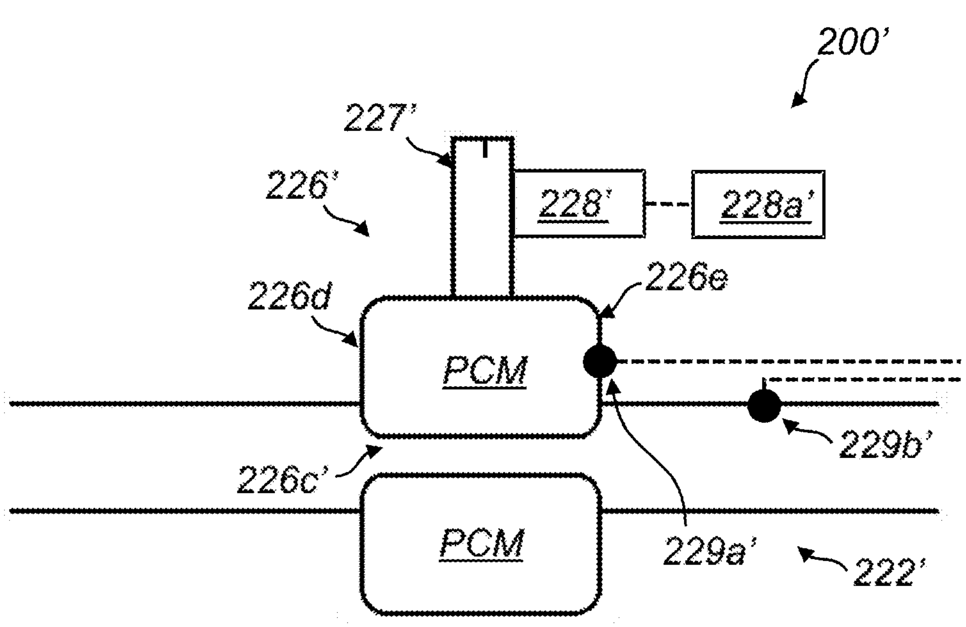
FIG. 6*b* shows a schematic diagram of the other bypass valve of the hydraulic actuator of FIG. 4 in an open state.

In another example, use is made of a phase-change material (PCM) to cause the opening of the port, as shown in FIGS. 6*a* and 6*b*. Here, the bypass valve 226' includes a toroidally-shaped valve component 226*d*. The valve component 226*d* has a wall 226*e* that encapsulates the PCM, which may be a wax, such as a paraffin wax. When a temperature of the valve component 226*d* is at least minus 20 degrees Celsius, the PCM is in a liquid state and portions of the wall 226*e* abut each other to block or seal the port 226*c'*, as shown in FIG. 6*a*. When the temperature of the valve component 226*d* drops below minus 20 degrees Celsius, the PCM changes to a solid state. While the wall 226*e* continues to contain or encapsulate the PCM, the portions of the wall separate from each other to open the port 226*c'* between them, as shown in FIG. 6*b*. In a variation to this embodiment, a PCM that instead undergoes a phase transition from one crystalline structure to another to cause the change in shape of the valve component 226*d* and thereby open the port 226*c'*, may be used. Examples of suitable such materials would be readily identifiable by the skilled person.

The automatic mechanism for controlling opening and closing of the bypass valve 226 of FIGS. 5*a* and 5*b* will now be described. The automatic mechanism makes use of the controller 260 and three further elements of the LGERS 20 that are communicatively connected to the controller 260: an aircraft status sensor system 270, an actuator condition sensor 280, and a user interface 290 that is in a cockpit of the aircraft 1 and, therefore, accessible by flight crew of the aircraft 1.

The aircraft status sensor system 270 comprises a weight-on-wheel sensor 272 that senses whether there is weight on the wheels 168, an altitude sensor 274 that senses an altitude of the aircraft 1, and a distance sensor 276 that senses a distance between the aircraft 1 and the ground over which the aircraft 1 is located. Each of these sensors 272, 274, 276 sends a respective signal to the controller 260. These signals collectively form an aircraft status signal that is sent to, and received by, the controller 260 and that indicates whether the aircraft 1 is performing one of a take-off procedure and a landing procedure. Naturally, the skilled reader will be aware of other sensors and mechanisms that could be used in other embodiments for indicating to the controller 260 whether the aircraft 1 is performing such a procedure, such as radio altimeters, pressure-based altimeters and Lidar.

The actuator condition sensor 280 in this example is a temperature sensor 280 that is mounted to an inside wall of the housing 202 in the extension chamber 206 of the actuator 200 at a position that does not overlap with a range of motion of the piston 204, detects a temperature of the hydraulic fluid in the extension chamber 206, and outputs to the controller 260 a condition signal indicative of the temperature of the hydraulic fluid in the extension chamber 206. The temperature of the hydraulic fluid in the extension chamber 206 is considered a condition of the actuator 200. In variations to this arrangement, the temperature sensor 280 may be mounted elsewhere in, or on, the actuator 200.

In respective alternative examples, the actuator condition sensor 280 instead comprises a timer that detects a time taken for the actuator 200 to actuate (i.e., a time taken for the piston 204 to complete a full sweep), a speedometer that detects a speed of actuation of the actuator 200, a pressure sensor arrangement that detects a pressure drop between two points (such as the extension and retraction chambers 206, 208) in the actuator 200, or a viscosity sensor that detects a viscosity of the hydraulic fluid in the actuator 200. Each of these parameters is also considered a condition of the actuator 200, and each listed type of actuator condition sensor outputs a condition signal indicative of the condition that the respective actuator condition sensor detects.

The controller 260 is programmed so that, on receipt of the condition signal, the controller 260 determines whether or not the condition meets a predetermined criterion. In the present example, this is by comparing the detected temperature to a predetermined threshold temperature that is stored in memory (not shown) to which the controller 260 has access, and determining whether or not the detected temperature is less than the predetermined threshold temperature. The predetermined threshold temperature is a temperature at, and above, which the hydraulic fluid would be sufficiently flowable to actuate the actuator 200 within an acceptable time period, and below which the hydraulic fluid would benefit from warming to ensure it remains sufficiently flowable for this purpose.

The controller 260 is programmed so that, only when the controller 260 determines that the detected temperature is less than the predetermined threshold temperature, i.e., the condition meets the predetermined criterion, the controller 260 sends a signal to the user interface 290 to cause the user interface 290 to provide a visual indication of the temperature to the flight crew on the basis of the condition signal. In this example, the visual indication is a numerical indication of the detected temperature presented on an LCD screen of the user interface 290. In other examples, the indication could take a different form of visual indication, such as illumination of a light of the user interface 290, or an audible indication, such as a buzzing, beeping or spoken-word sound from a speaker of the user interface 290.

The user interface 290 has a button that a member of the flight crew can press to cause input of a user request for the hydraulic fluid in the actuator 200 to be heated, having made an informed decision to do so after noting the indication of the temperature on the user interface 290. The user request in this example is an electrical signal. The user interface 290 is programmed to receive the user request and to send a user request signal indicative of the user request to the controller 260. In this example, the controller 260 does not blindly perform an operation to cause the bypass valve 226 to open whenever it receives such a user request signal. Instead, the controller 260 is programmed to perform the operation only when the controller has received such a user request signal and also has determined that the aircraft is performing the take-off procedure or the landing procedure, on the basis of the aircraft status signal from the aircraft status sensor system 270. As a result, the heat generation happens only when the actuator 200 is to be imminently operated as part of the take-off or landing procedure, and the flight crew retains ultimate authority to dictate when the heat generation is to happen.

The operation that the controller 260 performs is to cause a power interface (not shown) of an electrical motor of a motor-gearbox mechanism 228 of the bypass valve 226 to become electrically connected to an electrical power source (not shown) of the aircraft 1. The motor-gearbox mechanism 228 has a gear meshed with a male thread on a shaft 227 of the bypass valve 226. The shaft 227 is rotatably fixed to the first component 226*a* of the bypass valve 226, and the male thread of the shaft 227 is engaged with a female thread of a hole (not shown) in which the shaft 227 is located. Electrical connection of the power interface of the motor to the electrical power supply causes rotation of the motor. This causes rotation of the gear, which causes rotation and thus translational movement of the shaft 227 away from the second component 226*b* of the bypass valve 226, which moves the first component 226*a* of the bypass valve 226 away from the second component 226*b* of the bypass valve 226, to thereby open the port 226*c* between them.

The manual mechanism for controlling opening and closing of the bypass valve 226 of FIGS. 5*a* and 5*b* comprises a button 228*a* at an exterior of the actuator 200 in a location at which it is accessible for pressing by a member of ground crew. Pressing the button 228*a* causes the motor 228 to become electrically connected to the electrical power source of the aircraft 1 and thus to rotate in the manner described above. The distal end of the shaft 227 also has a drive recess in the form of a slot 227*a* in it, for receipt of the tip of a screwdriver. Either by insertion of, and subsequent rotation of, a screwdriver tip in the slot 227*a* or by pressing the button 228*a*, the member of ground crew is able to cause translational movement of the shaft 227 away from the second component 226*b* of the bypass valve 226, which moves the first component 226*a* away from the second component 226*b* to thereby open the port 226*c* between them. In other examples, the button 228*a* may be replaced by another type of user input interface, such as a handle connected to the shaft 227, that is configured to be engageable directly with, and operable directly by, one or more parts of a human being in order to cause the bypass valve 226 to open.

It will be seen that a corresponding arrangement of a shaft 277', a motor-gearbox mechanism 228' and a button 228*a*' is present in the bypass valve 226' of FIGS. 6*a* and 6*b*, except in that arrangement the shaft 227' is rotatably fixed to one side of the toroidally-shaped valve component 226*d* of the bypass valve 226'. Rotation of the electrical motor causes rotation of the gear, which causes rotation and thus translational movement of the shaft 227', which pulls that one side of the toroidally-shaped valve component 226*d* away from an opposite end of the toroidally-shaped valve component 226*d*, to thereby open the port 226*c*'.

The actuator 200 of FIGS. 4, 5*a* and 5*b* has a pair of valve status sensors 229*a*, 229*b* for sensing whether or not the bypass valve 226 is open and outputting respective signals accordingly to the controller 260. The two sensors 229*a*, 229*b* are of different respective types, to reduce a risk of there being a common mode failure that otherwise restricts or prevents sensing of whether or not the bypass valve 226 is open. A first 229*a* of the valve status sensors is a position sensor that is arranged relative to the first component 226*a* of the bypass valve 226 so as to be able to directly sense a position of the first component 226*a* relative to the first valve status sensor 229*a*. A second 229*b* of the valve status sensors is a flow meter that is mounted to a wall of the bypass line 222 and arranged to sense a flow of hydraulic fluid past the second valve status sensor 229*b* and thus through the bypass line 222. Such a flow would be indicative of the bypass valve 226 being open. The two sensors 229*a*, 229*b* are communicatively connected to the controller 260 and the signals they each output are valve status signals indicative of whether or not the bypass valve 226 is open. The controller 260 is programmed to receive the valve status signals and send respective associated signals to the user interface 290 to cause the user interface 290 to provide respective visual indications that the bypass valve 226 is open. Corresponding valve status sensors 229*a*', 229*b*' are present in the actuator 200' of FIGS. 6*a* and 6*b* and operate in a corresponding way. The first valve status sensor 229*a*' is a position sensor that is arranged relative to the toroidally-shaped valve component 226*d* the bypass valve 226' so as to be able to directly sense a position of the toroidally-shaped valve component 226*d* relative to the first valve status sensor 229*a*'.

Figure 7:
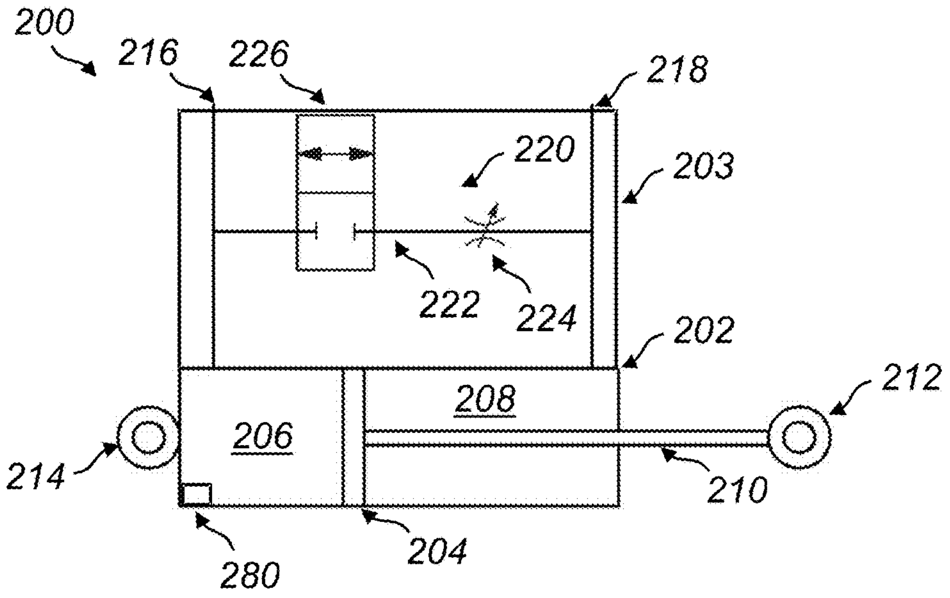
FIG. 7 shows a schematic diagram of an alternative hydraulic actuator for the landing gear extension and retraction system of FIG. 3.
Figure 8:
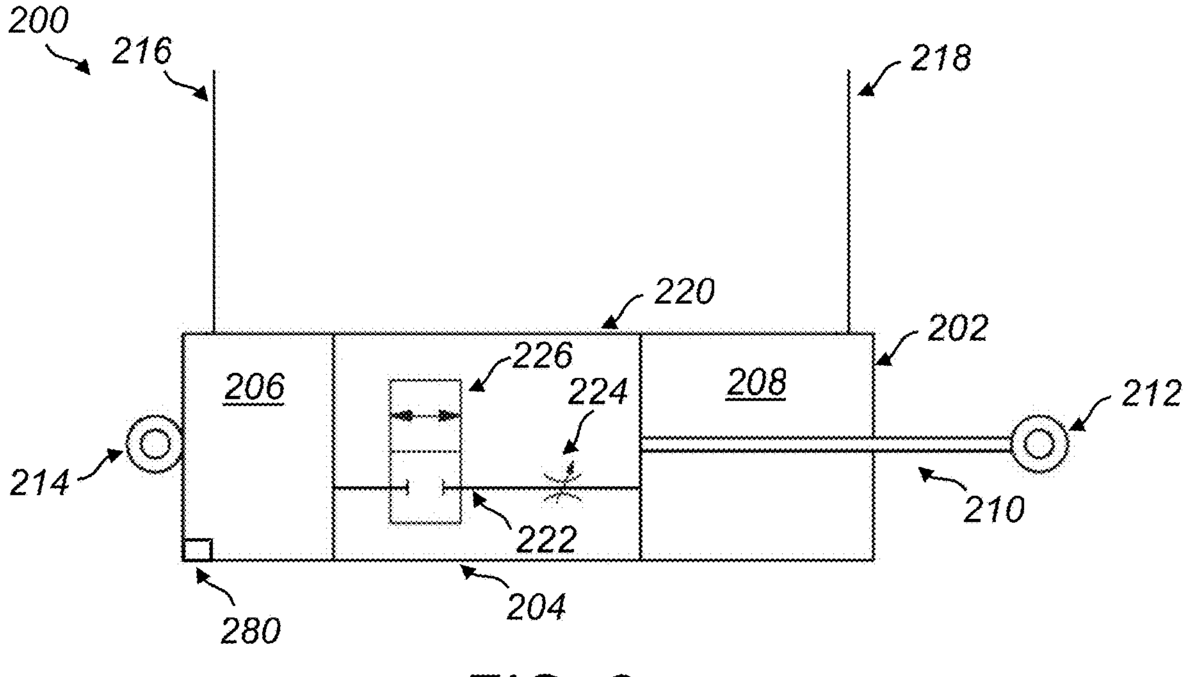
FIG. 8 shows a schematic diagram of a still further alternative hydraulic actuator for the landing gear extension and retraction system of FIG. 3.

In the embodiments shown in FIGS. 4 to 6*b*, the bypass line 222, 222' is located outside of the housing 202 of the actuator 200, 200'. In respective variations to these embodiments, the bypass line 222, 222' is instead located within a wall 203 of the housing 202, which is a wall 203 of the extension chamber and of the retraction chamber, as shown schematically in FIG. 7. In still further respective variations to these embodiments, the bypass line 222, 222' is instead located within the piston 204 of the actuator 200, 200', as shown schematically in FIG. 8.

Figure 9:
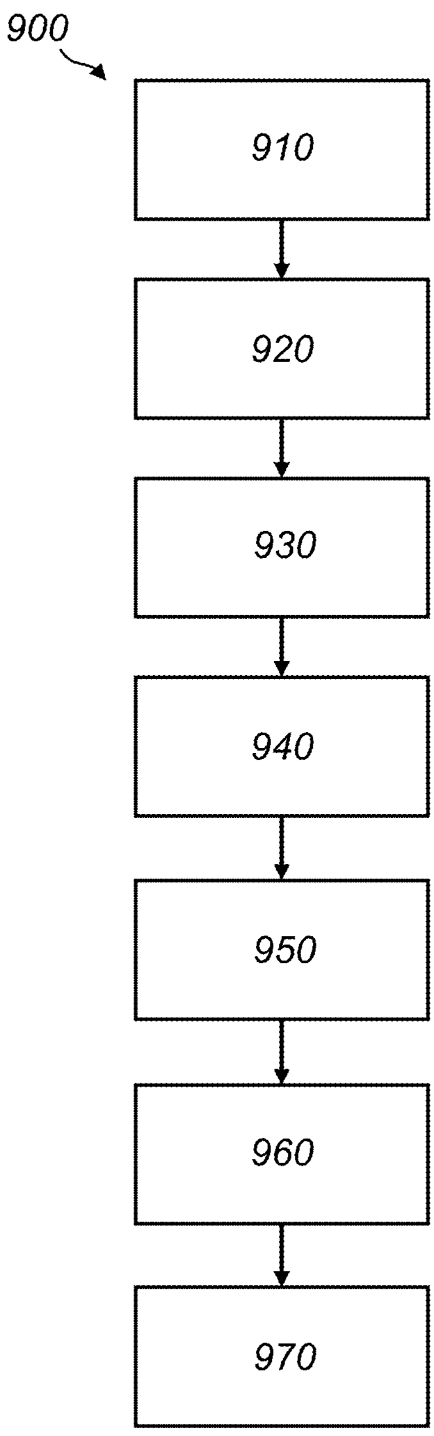
FIG. 9 shows a flow diagram showing an example of a method of operating the landing gear extension and retraction system of FIG. 3.

A method 900 of operating the landing gear extension and retraction system of FIGS. 3, 4, 5*a* and 5*b* is shown in FIG. 9. The controller 260 is a computing system comprising a plurality of processors configured to perform the method 900. The aircraft 1 comprises a data carrier (not shown) that holds machine readable instructions for the operation of the processors to perform the method 900. These machine-readable instructions are a computer program comprising instructions which, when the program is executed by the controller 260, cause the controller 260 to carry out the method 900. In this embodiment, the processors are all in one controller. In some other embodiments, the controller 260 comprises plural controllers, and the processors are in respective ones of the controllers.

The method 900 comprises the controller 260 receiving 910, from the aircraft status sensor system 270, an aircraft status signal indicative that the aircraft 1 is performing one of a take-off procedure and the landing procedure, and determining 920 that the aircraft 1 is performing the take-off procedure or the landing procedure on the basis of the aircraft status signal received. The method 900 also comprises receiving 930, from the actuator condition sensor 280, a condition signal indicative of a condition of the actuator 200, namely a temperature of the hydraulic fluid in the extension chamber 206; determining 940 whether or not the condition meets a predetermined criterion, by determining whether or not the detected temperature is less than a predetermined threshold temperature; and sending 950, to the user interface 290, a signal to cause the user interface 290 to provide an indication of the temperature to the flight crew, when the controller 260 determines that the detected temperature is less than the predetermined threshold temperature. The method 900 also comprises receiving 960, from the user interface 290, a user request signal indicative of a user request for the hydraulic fluid in the actuator 200 to be heated; and causing 970 the power interface of the electrical motor of the motor-gearbox mechanism 228 of the bypass valve 226 to become electrically connected to the electrical power source of the aircraft 1, to cause rotation of the motor and thus opening of the bypass valve 226 to allow the hydraulic fluid to flow through the bypass line 222, only when the controller 260 determines that the aircraft 1 is performing the take-off procedure or the landing procedure and the controller 260 has received the user request signal.

Naturally, in other embodiments, the method 900 will differ from that set out above, depending on the features of the actuator 200 and the hydraulic actuation system. For example, in some embodiments, the actuator condition sensor 280 is a viscosity sensor that detects a viscosity of the hydraulic fluid in the actuator 200, rather than the temperature sensor. In such embodiments, the condition signal received at 930 would be indicative of that viscosity, the determination 940 would be whether or not the detected viscosity is higher than a predetermined threshold viscosity, and in some such embodiments the signal sent 950 to the user interface 290 would be to cause the user interface 290 to provide an indication of the viscosity to the flight crew, when the controller 260 determines that the detected viscosity is higher than the predetermined threshold viscosity.

Moreover, in some embodiments, some of the processes in the method 900 would be omitted. For example, in some embodiments, processes 910-960 would be omitted and process 970 would comprise causing the power interface of the electrical motor of the motor-gearbox mechanism 228 of the bypass valve 226 to become electrically connected to the electrical power source of the aircraft 1 only when the controller 260 determines that the aircraft 1 is performing the take-off procedure or the landing procedure and regardless as to whether or not the controller 260 has received a user request signal.

While in the illustrated embodiments the component that the actuator 200, 200' is configured to move is the landing gear 16, in other embodiments the component is another part of the aircraft 1, such as a landing gear bay door, a cargo door, or a component of a brake system.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

It is to be noted that the term "or" as used herein is to be interpreted to mean "and/or", unless expressly stated otherwise.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A hydraulic actuation system for an aircraft, the hydraulic actuation system comprising:

a hydraulic actuator comprising:

a housing configured to accommodate hydraulic fluid;

an extension chamber and a retraction chamber each defined by the housing; and a bypass line in fluid communication with each of the extension chamber and the retraction chamber, the bypass line comprising a flow restrictor and a bypass valve, the flow restrictor configured to restrict a rate of fluid flow through the bypass line; and a controller configured to receive an aircraft status signal indicative that the aircraft is performing one of: a take-off procedure and a landing procedure, and configured to determine that the aircraft is performing the take-off procedure or the landing procedure based on the aircraft status signal, and configured to perform an operation to cause the bypass valve to open to allow the hydraulic fluid to flow through the bypass line only when the controller determines that the aircraft is performing the take-off procedure or the landing procedure, wherein the housing comprises a wall of the extension chamber, or of the retraction chamber, or both, and wherein the bypass line is at least partially located within the wall.

2. The hydraulic actuation system of claim 1, further comprising:

a user interface configured to receive a user request from a flight crew and to send a user request signal indicative of the user request to the controller, and wherein the controller is configured to perform the operation only when the controller has:

received the user request signal, and determined that the aircraft is performing the take-off procedure or the landing procedure.

3. The hydraulic actuation system of claim 2, further comprising:

a condition sensor configured to detect a condition of the hydraulic actuator and to output a condition signal indicative of the condition.

4. The hydraulic actuation system of claim 3, wherein the hydraulic actuation system comprises a control system, the condition sensor configured to output the condition signal to the control system, and the control system configured to cause the user interface to provide an indication of the condition to the flight crew based on the condition signal.

5. The hydraulic actuation system of claim 4, wherein the control system is configured, based on the condition signal, to determine whether or not the condition meets a predetermined criterion, and to cause the user interface to provide the indication only when the control system determines that the condition meets the predetermined criterion.

6. The hydraulic actuation system of claim 1, further comprising:

an aircraft status sensor system configured to sense that the aircraft is performing the one of: the take-off procedure and the landing procedure, and to send the aircraft status signal to the controller.

7. The hydraulic actuation system of claim 1, wherein the flow restrictor is in series with the bypass valve.

8. The hydraulic actuation system of claim 1, wherein the flow restrictor has an open cross-sectional area of between 4 $mm^2$ and 14 $mm^2$.

9. The hydraulic actuation system of claim 1, further comprising:

a valve status sensor configured to sense whether or not the bypass valve is open and to output a valve status signal indicative of whether or not the bypass valve is open.

10. The hydraulic actuation system of claim 9, wherein the valve status sensor comprises one or more of:

a sensor configured to sense a state of the bypass valve; and a sensor configured to sense a parameter of hydraulic fluid in the bypass line.

11. The hydraulic actuation system of claim 1, wherein the bypass line is at least partially located outside of the housing.

12. The hydraulic actuation system of claim 1, wherein the hydraulic actuator comprises a movable separator separating the extension chamber from the retraction chamber, and the bypass line is located within the movable separator.

13. The hydraulic actuation system of claim 1, wherein the hydraulic actuator comprises:

a first hydraulic line fluidically connected to the extension chamber, and a second hydraulic line fluidically connected to the retraction chamber;

wherein the bypass line has a first end that opens directly into the first hydraulic line, and a second end that opens directly into the second hydraulic line.

14. The hydraulic actuation system of claim 1, further comprising:

a supply line fluidly connected to the extension chamber and configured to carry hydraulic fluid pressurized to a supply pressure to the extension chamber; and a return line fluidly connected to the retraction chamber and configured to return hydraulic fluid to a reservoir from the retraction chamber.

15. The hydraulic actuation system of claim 1, wherein the hydraulic actuation system is a landing gear system.

16. An aircraft comprising:

the hydraulic actuation system of claim 1.

17. A method of operating a hydraulic actuation system of an aircraft, the hydraulic actuation system comprising: a hydraulic actuator comprising a housing configured to accommodate hydraulic fluid, an extension chamber and a retraction chamber each defined by the housing, and a bypass line in fluid communication with each of the extension chamber and the retraction chamber, the bypass line comprising a flow restrictor and a bypass valve, the flow restrictor being configured to restrict a rate of fluid flow through the bypass line, a controller configured to receive an aircraft status signal indicative that the aircraft is performing one of: a take-off procedure and a landing procedure, and a user interface configured to receive a user request from a flight crew and to send a user request signal indicative of the user request to the controller;

the method comprising:

performing an operation, to cause the bypass valve to open to allow the hydraulic fluid to flow through the bypass line, when the aircraft is performing one of the take-off procedure and the landing procedure, wherein the operation is only performed when the controller has:

received the user request signal, and determined that the aircraft is performing the take-off procedure or the landing procedure.

18. The method of claim 17, wherein the hydraulic actuation system comprises a controller, and wherein the method comprises the controller:

receiving an aircraft status signal indicative that the aircraft is performing the take-off procedure or the landing procedure;

determining that the aircraft is performing the take-off procedure or the landing procedure based on the aircraft status signal; and performing the operation only when the controller determines that the aircraft is performing the take-off procedure or the landing procedure.

19. A non-transitory computer readable media comprising instructions which, when executed by the controller, cause the controller to perform the method of claim 18.

20. A hydraulic actuation system for an aircraft, the hydraulic actuation system comprising:

a hydraulic actuator comprising:

a housing configured to accommodate hydraulic fluid;

an extension chamber and a retraction chamber each defined by the housing; and a bypass line in fluid communication with each of the extension chamber and the retraction chamber, the bypass line comprising a flow restrictor and a bypass valve, the flow restrictor configured to restrict a rate of fluid flow through the bypass line;

a controller configured to receive an aircraft status signal indicative that the aircraft is performing one of: a take-off procedure and a landing procedure, and configured to determine that the aircraft is performing the take-off procedure or the landing procedure based on the aircraft status signal, and configured to perform an operation to cause the bypass valve to open to allow the hydraulic fluid to flow through the bypass line only when the controller determines that the aircraft is performing the take-off procedure or the landing procedure; and a valve status sensor configured to sense whether or not the bypass valve is open and to output a valve status signal indicative of whether or not the bypass valve is open.

* * * * *